United States Patent
Radunz et al.

(10) Patent No.: US 11,479,206 B2
(45) Date of Patent: Oct. 25, 2022

(54) METHOD FOR DETERMINING INFORMATION WITH RESPECT TO AN OCCUPANT AND/OR A SEAT BELT OF A MOTOR VEHICLE, COMPUTER PROGRAM PRODUCT AND SEAT BELT ARRANGEMENT FOR A MOTOR VEHICLE

(71) Applicant: JOYSON SAFETY SYSTEMS GERMANY GMBH, Aschaffenburg (DE)

(72) Inventors: Yves Radunz, Strausberg (DE); Lukas Scholz, Berlin (DE); Florian Ripper, Berlin (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 0 days.

(21) Appl. No.: 17/238,002

(22) Filed: Apr. 22, 2021

(65) Prior Publication Data
US 2021/0331644 A1    Oct. 28, 2021

(51) Int. Cl.
*B60R 22/48* (2006.01)

(52) U.S. Cl.
CPC ........ *B60R 22/48* (2013.01); *B60R 2022/485* (2013.01)

(58) Field of Classification Search
CPC ....... B60R 22/46; B60R 22/48; B60R 21/015; B60R 21/01532; B60R 21/01548; B60R 2022/485
See application file for complete search history.

(56) References Cited

U.S. PATENT DOCUMENTS

| 6,581,960 | B1 | 6/2003 | Schondorf |
| 6,784,379 | B2* | 8/2004 | Breed ............... B60R 21/01542 |
| | | | 177/144 |
| 10,124,762 | B2 | 11/2018 | Hennes et al. |
| 2008/0042409 | A1 | 2/2008 | Breed |

(Continued)

FOREIGN PATENT DOCUMENTS

| DE | 101 33 759 A1 | 1/2003 |
| DE | 600 15 481 T2 | 3/2005 |

(Continued)

OTHER PUBLICATIONS

NPL Search (Jun. 13, 2022).*

*Primary Examiner* — Van T Trieu
(74) *Attorney, Agent, or Firm* — Gordon Rees Scully; Mansukhani, LLP

(57) ABSTRACT

It is provided a method for determining information with respect to an occupant and/or a seat belt of a motor vehicle, wherein the seat belt includes a plurality of sensors. The method comprises the following steps: determining a force acting on each of the sensors in a sensor coordinate system associated with each of the sensors; generating a numerical model of the seat belt and the sensors in an initial state; generating a final state of the model by varying positions and/or orientations of portions of the modeled seat belt, which are in a fixed geometrical relationship with the represented positions and/or orientations of at least some of the sensors; and determining the information with respect to the occupant and/or the seat belt based on the course of the modeled seat belt in the final state.

15 Claims, 5 Drawing Sheets

(56) References Cited

U.S. PATENT DOCUMENTS

| | | | | |
|---|---|---|---|---|
| 2008/0319617 A1* | 12/2008 | Takemura | ......... | B60R 21/01546 701/45 |
| 2019/0168710 A1 | 6/2019 | Liau | | |
| 2019/0193676 A1* | 6/2019 | Thomas | ................. | B60R 22/18 |

FOREIGN PATENT DOCUMENTS

| | | |
|---|---|---|
| DE | 10 2006 040 244 B3 | 8/2007 |
| DE | 10 2015 222 499 B3 | 1/2017 |
| DE | 10 2016 208 828 A1 | 1/2017 |
| DE | 10 2016 122 806 A1 | 5/2018 |
| JP | 2006-008110 A | 1/2006 |
| WO | 2006/086171 A2 | 8/2006 |
| WO | 2018/095569 A1 | 3/2018 |

\* cited by examiner

METHOD FOR DETERMINING INFORMATION WITH RESPECT TO AN OCCUPANT AND/OR A SEAT BELT OF A MOTOR VEHICLE, COMPUTER PROGRAM PRODUCT AND SEAT BELT ARRANGEMENT FOR A MOTOR VEHICLE

REFERENCE TO RELATED APPLICATION

This application claims priority to German Patent Application No. 10 2020 205 180.1 filed on Apr. 23, 2020, the entirety of which is incorporated by reference herein.

BACKGROUND

This disclosure relates to a method for determining information with respect to an occupant and/or a seat belt of a motor vehicle, a computer program product, and a seat belt arrangement for a motor vehicle.

It is known from the prior art to determine information with respect to a seat belt of a motor vehicle on the basis of sensors that are mounted on the seat belt. For example, US 2019/0168710 A1 discloses a corresponding seat belt arrangement.

SUMMARY

An object underlying the proposed solution consists in obtaining information as reliable as possible with respect to the seat belt and/or a vehicle occupant using the seat belt.

This object is solved by providing the method with features as described herein, the computer program product with features as described herein and the seat belt arrangement with features as described herein.

Accordingly, there is provided a method for determining information with respect to an occupant and/or a seat belt of a motor vehicle, wherein the seat belt includes a plurality of sensors, the method comprising the following steps:
  determining a force acting on the sensors in a sensor coordinate system associated with each of the sensors;
  generating a numerical model of the seat belt and the sensors in an initial state (i.e. a numerical model that includes a modeled seat belt and modeled sensors), wherein the model represents the positions and orientations of the sensors as well as the directions of the forces determined by each of the sensors (in particular relative to the seat belt);
  generating a final state of the model by varying positions and/or orientations of portions of the modeled seat belt, which are in a fixed geometrical relationship with the represented positions and/or orientations of at least some of the sensors, proceeding from the initial state, until in a coordinate system corresponding to a vehicle coordinate system the deviations of the directions of the forces determined by the sensors from the direction of the gravitational force are minimal; and
  determining information with respect to the occupant and/or the seat belt based on the course of the modeled seat belt in the final state.

The coordinate axes of the coordinate system associated with each of the sensors ("sensor coordinate system") in particular extend along the measurement directions or axes of symmetry of the respective sensor. The direction of a force or acceleration determined each by means of the sensors initially can only be indicated relative to the measurement directions or axes of symmetry of the sensor, i.e. in the sensor coordinate system. An indication in a coordinate system associated with the vehicle ("vehicle coordinate system") requires the knowledge at least of the orientation of the sensors. Conversely, with knowledge of the direction of the forces each acting on the sensors, the orientation of the sensors can be inferred.

Moreover, the (real) sensors in particular are each firmly attached to a portion of the seat belt so that the model assumes a defined, fixed geometrical relationship between the position and the orientation of the sensors and of structures of the seat belt associated with each of the sensors. In particular, the position and the orientation of the sensors are each linked with a position and orientation of a portion of the seat belt on which the sensors are arranged. It is also conceivable that a defined geometrical relationship exists between the position and the orientation of the sensor and the position of adjacent portions of an edge of the seat belt.

The model of the seat belt and of the sensors attached to the same in the initial state is created such that the positions of the sensors relative to the seat belt correspond to the real conditions as exactly as possible. In particular, the sensors in the model are positioned identically to the real seat belt system, i.e. in particular with distances to the edges of the seat belt, which each correspond to the real distances or are unambiguously associated with the same. In addition, the orientations of the sensors relative to the seat belt also are correspondingly chosen in the model.

Based on the sensor data, a force acting on each of the sensors is determined, wherein it is assumed in particular that this force each at least substantially is the gravitational force. It is also conceivable that other forces acting on the sensors are detected, for example by means of a corresponding sensor system (for example of the vehicle), and are used for the correction of the force detected by each of the sensors of the seat belt. For modeling the spatial course of the seat belt in the vehicle coordinate system (corresponding to the world coordinate system) the position and/or orientations of the portions of the model of the seat belt, on which the sensors are arranged, are varied until the directions of the determined forces point down in the vehicle coordinate system, i.e. correspond to the direction of the gravitational force. In principle, for example, the sensors are any force or acceleration sensors.

The orientation of the portions of the seat belt with the sensors is effected by means of an optimization algorithm (minimization algorithm) such that the deviations of the directions of the determined forces from the direction of the gravitational force become minimal, i.e. reach a specifiable limit value. It is conceivable that the deviation is minimized individually for each sensor. It is also possible, however, that a sum minimization is effected, for example in the manner of a least-square algorithm. However, the solution is of course not limited to a particular minimization algorithm. The "final state" of the model of the seat belt is not necessarily the absolute final state of the model. Rather, further steps for varying the model can also be effected upon completion of the optimization algorithm. The "final state" of the application of the optimization algorithm can also be the initial state of a repeated application of the optimization algorithm in order to reduce the calculation effort when modeling the course of the seat belt again at a later time.

According to an embodiment, at least two support places (in particular two support points or support portions of the model of the seat belt) are each associated with the modeled sensors (and hence the portions of the seat belt that include the sensors) in the model of the seat belt, wherein positioning and/or orienting the portions is effected by positioning the support places.

It is conceivable that the positioning of the support places is effected during the minimization by observing specified boundary conditions.

For example, the one support place of the two support places associated with a modeled sensor is associated with a point of a first edge of the modeled seat belt, and the second support place is associated with a point of a second, opposite edge of the modeled seat belt. It is also possible that the two support places associated with a modeled sensor have a distance from each other that corresponds to the width of the seat belt (for example is identical with the width of the seat belt). In addition, the distance between adjacent support places associated with different modeled sensors can be the same along the longitudinal direction of the modeled seat belt. It is also conceivable that the two support places must each be positioned such that one of the modeled sensors each is located on a connecting line between the two support places extending perpendicularly to the longitudinal direction of the modeled seat belt.

The model of the seat belt can also contain a position of an (upper) deflection device for deflecting the seat belt, through which the belt must extend. For example, a distance and/or a course of the seat belt between the position of the deflection device and at least one of the support places adjacent to the deflection device (i.e. those support places that are associated with the sensor that is located closest to the deflection device) is specified in the model (and for example is kept constant during the optimization). Specifying the course of the seat belt for example consists in specifying a belt direction in the vicinity of the at least one support place; e.g. with the request that the support place must be positioned such that the sensor associated with the same, and hence a portion of the belt associated with the sensor, must be oriented in the direction of the deflection device (and in particular an extension of the portion extends in the direction of the deflection device or through the deflection device), The position of the support place can vary for example in dependence on a belt extension length.

Moreover, the model of the seat belt can also contain a position of a lower deflection device in the vicinity of a belt buckle to which the seat belt is connected, wherein the model specifies a distance and/or a course of the seat belt between the position of the lower deflection device and at least one of the support places adjacent to the lower deflection device. The course of the seat belt is specified in particular as explained above with respect to the upper deflection device.

The positions of the deflection devices are defined for example on the basis of a respectively distinguished point of the deflection devices. It is conceivable that these points are located centrally with respect to the seat belt and adjacent to the same. The positions of the deflection devices for example provide anchor points of the model, i.e. points whose position in the coordinate system corresponding to the vehicle coordinate system remains fixed during the positioning of the portions or the support places.

It is also conceivable that the model of the seat belt is created such (i.e. the optimization is executed such) that the course of the modeled seat belt has as little curvature as possible. For example, the optimization (the minimization) is effected such that in the modeled seat belt the sum of the angles between adjacent connecting lines, which each extend between two support places associated with a sensor, becomes minimal.

The modeling of the spatial course of the seat belt is completed when specified termination conditions are fulfilled, or when no more significant changes of the spatial course are to be found in successive steps during the processing of the optimization algorithm.

Based on the course of the modeled seat belt, in particular information with respect to the height of the vehicle occupant, the seating position of the vehicle occupant, the seating posture of the vehicle occupant and/or the status of the seat belt is determined as information with respect to the vehicle occupant (the user of the seat belt) and/or the seat belt. For example, the modeled course of the seat belt is employed in order to determine whether the belt is fastened correctly (and for example does not extend behind the vehicle occupant). For example, the modeled course at least of portions of the seat belt is compared with a reference course.

According to another embodiment, a reaction of a system of the vehicle occurs depending on the determined information. For example, a corresponding warning signal is output.

The solution also relates to a computer program product comprising commands which on execution of the program by a computer cause the same to execute the method according to the proposed solution. The solution furthermore comprises a storage medium with the computer program product according to proposed solution.

The solution also relates to a seat belt arrangement for a motor vehicle, in particular for carrying out the method according to the proposed solution, comprising:
 a seat belt,
 a plurality of sensors arranged on the seat belt;
 an evaluation device for evaluating signals of the sensors, wherein the evaluation device is configured to carry out the following steps:
  determining a force acting on each of the sensors in a sensor coordinate system associated with each of the sensors;
  generating a numerical model of the seat belt in an initial state, which contains the positions and orientations of the sensors as well as the directions of the forces determined by each of the sensors in the respective sensor coordinate system;
  generating a final state of the model by varying positions and/or orientations of portions of the modeled seat belt, which are in a fixed geometrical relationship with the positions and/or orientations of at least some of the sensors, proceeding from the initial state, until in a coordinate system corresponding to a vehicle coordinate system the deviations of the directions of the forces determined by the sensors from the direction of the gravitational force are minimal; and
  determining information with respect to the occupant and/or the seat belt based on the course of the modeled seat belt in the final state.

The embodiments of the solution explained above with respect to the method can of course be used analogously for developing the seat belt arrangement according to the solution.

The evaluation unit in particular is a programmable unit of the motor vehicle; for example a correspondingly programmed vehicle ECU.

The sensors for example are at least partly arranged on the seat belt in a grid-like pattern. For example, adjacent sensors at least partly have the same distance from each other. A grid-like arrangement of the sensors, however, is not absolutely necessary. Rather, the sensors in principle can arbitrarily be positioned on the seat belt and/or be oriented relative to the seat belt, wherein the model of the seat belt with the sensors takes account of the respective position and orientation of the sensors.

BRIEF DESCRIPTION OF THE DRAWINGS

The solution will be explained in detail below by means of exemplary embodiments with reference to the Figures.

DETAILED DESCRIPTION

Figure 1:
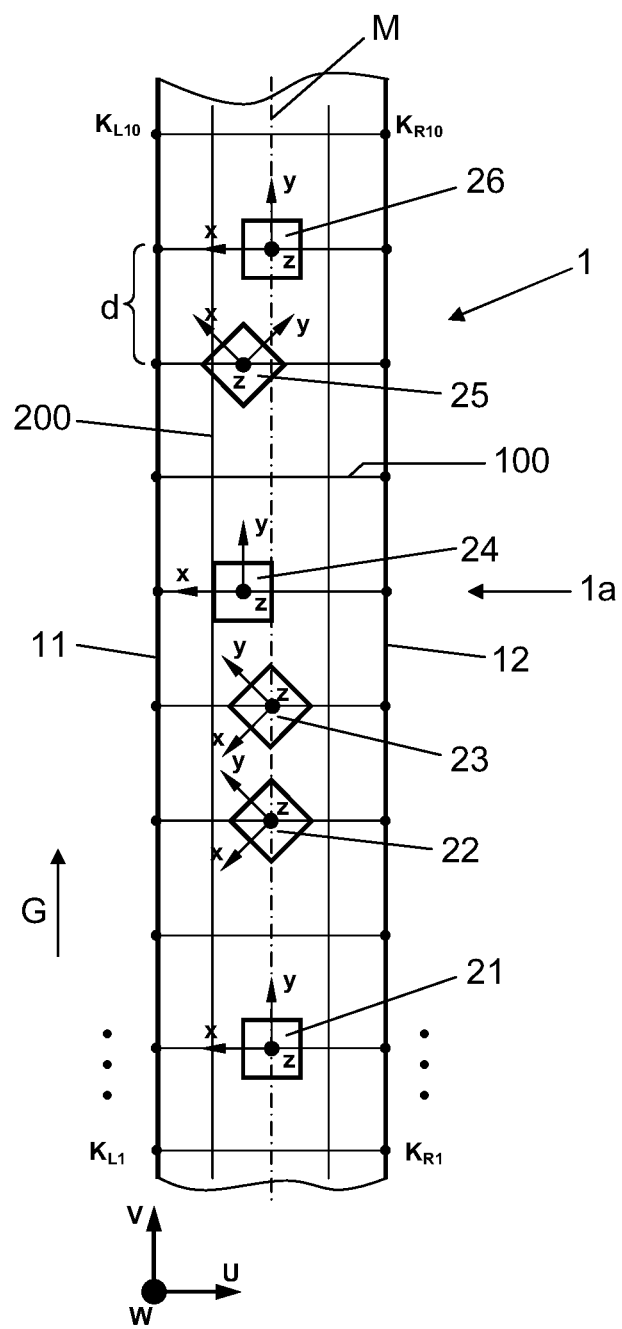
FIG. 1 shows a portion of a real seat belt equipped with a plurality of sensors in a state spread out flat.

FIG. 1 shows a portion 1a of a seat belt 1 equipped with a plurality of sensors 21-26 in a state spread out flat. With the seat belt 1 fastened, the portion 10 extends substantially along the upper body of the vehicle occupant associated with the seat belt 1 between an upper and a lower belt deflector (see FIG. 2).

With each of the sensors 21-26, which in particular are triaxial acceleration sensors, a local coordinate system x-y-z is associated, whose axes extend for example along the measurement directions of the sensors 21-26. The sensors 21-26 each are firmly arranged on a portion of the seat belt 1 so that in a coordinate system U-V-W associated with the seat belt 1 or in a vehicle coordinate system X-Y-Z (cf. FIG. 2) a defined geometrical relationship exists between the position and the orientation of the sensors 21-26 and the position and orientation of the respective portion of the seat belt 1, on which the sensors 21-26 are arranged, and for example also the position and orientation of portions of lateral edges 11, 12 of the seat belt 1 at the level of the sensors 21-26. The "position" of the sensors 21-26 in the belt coordinate system U-V-W or the vehicle coordinate system X-Y-Z is given for example by the position of a center of the respective sensor. The "orientation" of the sensors 21-26 in the belt coordinate system U-V-W or the vehicle coordinate system X-Y-Z in particular corresponds to the orientation of the respective sensor coordinate system x-y-z in the belt coordinate system U-V-W or the vehicle coordinate system X-Y-Z.

The sensors 21-26 can be arranged both centrally and offset from the belt center M and can have identical or varying distances from each other along the belt longitudinal direction G. In addition, the sensors can at least partly be oriented differently, i.e. the orientation of the measurement axes of different sensors can be different. In addition, groups of sensors can be provided, wherein in particular a plurality of sensors arranged at a small or no distance from each other can be associated with a portion of the seat belt 1. It is of course also conceivable that more or less than the six sensors shown in FIG. 1 are present on the seat belt 1.

In the exemplary embodiment shown in FIG. 1, the sensors 21-26 are arranged in a grid-like pattern, i.e. in an imaginary, regular grid whose horizontal and vertical grid lines 100, 200 each have identical distances from each other and extend at right angles to each other. Some of the horizontal grid lines 100 intersect the coordinate origin of the local coordinate systems x-y-z of the sensors 21-26. The distances of the sensors 21-26 in the belt longitudinal direction G (belt direction of extension) for example correspond to a defined basic distance d or an integral multiple thereof.

Selected nodal points in the grid of the lines 100, 200 correspond to points (support points) in a model of the seat belt which is employed for determining the course of the seat belt 1 in the in the vehicle coordinate system. In the present case, these are the intersection points KL1-KL10 of the horizontal grid lines 100 with the left belt edge 11 in FIG. 1 and the intersection points KR1-KR10 with the right belt edge 12. It can be seen that the selected nodal points can be positioned before or behind a first or last sensor 21, 26 along the belt direction of extension.

It should be noted that the illustrated distribution of the sensors 21-26 is to be understood merely by way of example in the sense of an exemplary embodiment and has been chosen as such merely for a better representation. An arrangement of the sensors 21-26 might also be effected in a grid whose grid lines are oriented at an angle to the belt extension G (for example extend at a certain angle relative to the U-axis or V-axis of the belt coordinate system) and/or have different distances to each other (irregular grid). It is also conceivable that the sensors and/or the selected nodal points at least partly are not arranged in a grid, but each have a defined position and orientation with respect to at least one portion of the seat belt 1.

Figure 2:
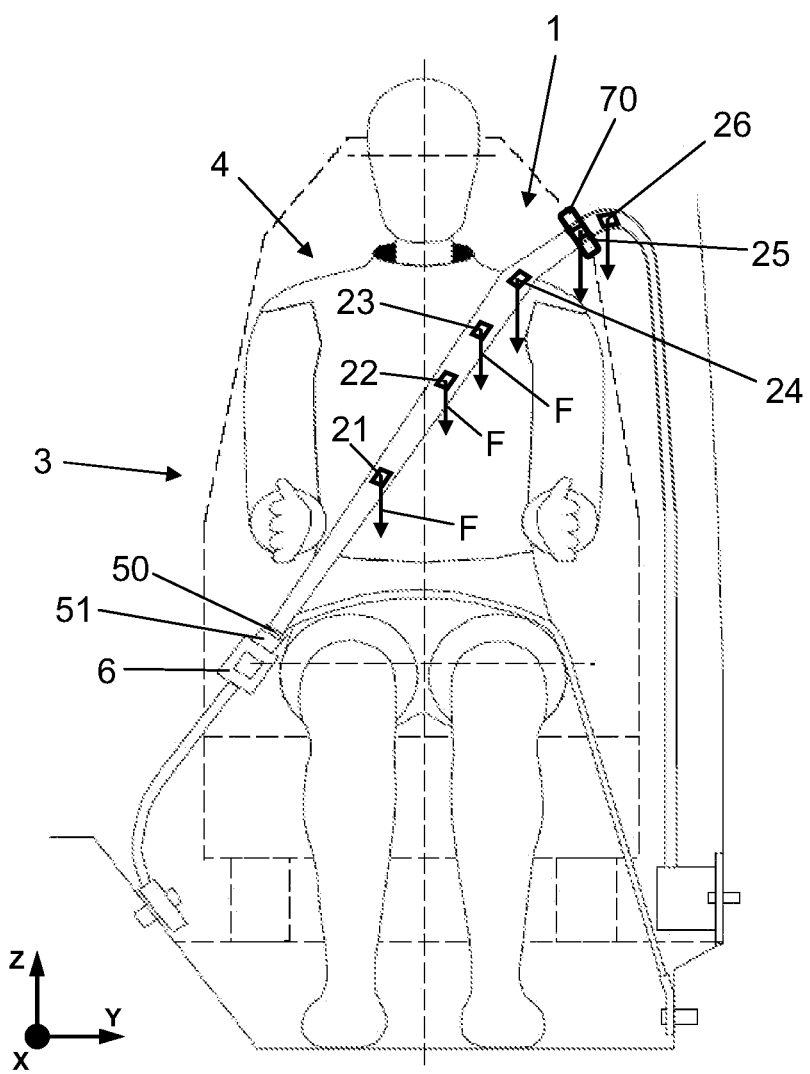
FIG. 2 shows a vehicle occupant with the seat belt fastened.

FIG. 2 shows an occupant 4 seated on a vehicle seat 3 with a fastened seat belt 1 of a seat belt arrangement 10. The seat belt arrangement 10 comprises a lower belt deflector 50, which is associated with a belt tongue 51 in engagement with a belt buckle 6. In the upper region of the vehicle seat 3 an upper belt deflector 70 is arranged. Alternatively, the upper belt deflector 70 can be disposed on the vehicle body, e.g. in the upper region of the B-pillar of the vehicle.

By means of the sensors 21-26 arranged on the seat belt 1, a force F acting on each of the same is determined, wherein the direction of the respectively acting force F at least substantially corresponds to the direction of the gravitational force. Correspondingly, the respectively acting forces F point down in the vehicle coordinate system X-Y-Z, i.e. in the direction of the Z-axis.

The determination of the forces F acting on the sensors 21-26 can start at the same time as the fastening of the seat belt 1 (for example when putting the belt tongue 51 into the belt buckle 6) or temporally offset therefrom at a fixed point in time or upon occurrence of a defined event (for example the start of the motor of the vehicle).

It is pointed out that according to FIG. 2 the sensors 21-26 for the most part are arranged on an upper body portion of the seat belt 1, but the method of the proposed solution can also be carried out with sensors that are disposed on a lap belt portion of the seat belt 1.

Figure 3:
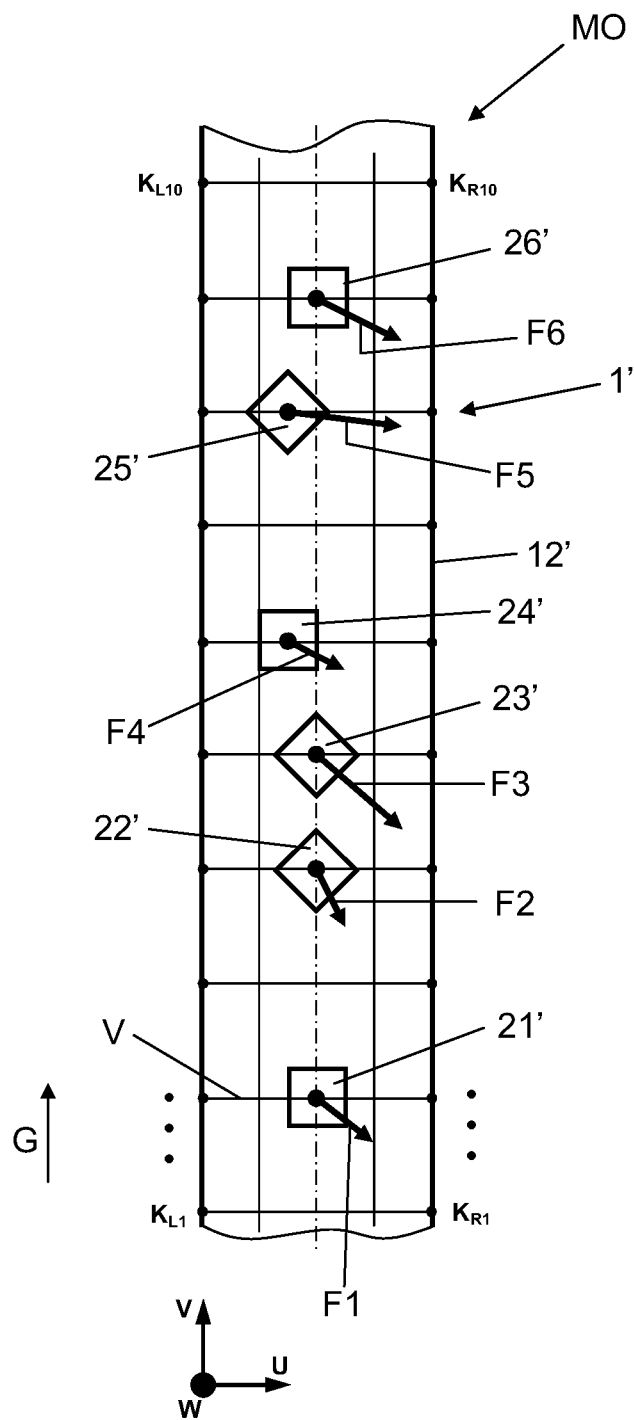
FIG. 3 shows a model of the seat belt of FIG. 1 in an initial state.

FIG. 3 illustrates a (numerical) model MO (comparative arrangement) of the seat belt 1 shown in FIG. 1 and of the sensors 21-26 in an initial state, wherein the modeled seat belt is designated with "1'" and the modeled sensors are designated with "21'-26'". In the initial state, the course of the modeled seat belt 1' does not yet correspond to the course of the real seat belt 1. The initial state of the modeled seat belt 1' as shown in FIG. 3 corresponds to the state of the seat belt 1 spread out flat as shown in FIG. 1. However, this is not absolutely necessary.

In the initial state, the model MO of the seat belt 1 contains positions and orientations of the sensors 21'-26' relative to the modeled seat belt 1', which exactly correspond to the real conditions. In the initial state of the model MO of the seat belt 1, the directions and the amounts of the forces F1-F6 determined by the sensors 21-26 under the influence of the forces F (cf. FIG. 2) each are specified in their local coordinate system x-y-z. The coordinate origin of the local sensor coordinate systems x-y-z for example is identical with the point of application of the respective measured force F1-F6 (of the associated acceleration vectors). In the initial state of the model MO, the forces F1-F6 point in different directions in space. It is conceivable that the model MO does not include a spatial representation of the sensors 21-26, but merely contains the respective positions and orientations of the sensors. The position of the sensors for example is each represented by a representative point (for example the geometrical center) of the sensor, wherein in the model the forces F1-F6 each determined by the sensors for example act on the representative point.

To generate a model MO of the seat belt 1 whose course corresponds to the course of the real seat belt 1 as far as possible, portions of the seat belt 1', on which the sensors 21'-26' are arranged, are positioned and oriented proceeding from the initial state of the model MO such that the directions of the forces F1-F6 in the vehicle coordinate system X-Y-Z each correspond to the direction of the gravitational force (the forces F in FIG. 2), i.e. the forces F1-F6 in the vehicle coordinate system X-Y-Z each point down in the Z-direction.

The positioning and/or orienting of the portions of the modeled seat belt 1' with the sensors 21'-26' is effected by positioning the support points each associated with the sensors 21'-26', namely the nodal points KL1-KL10, KR1-KR10 of the grid of the modeled seat belt 1' described already in connection with FIG. 1. By application of an optimization algorithm, the positions of the nodal points KL1-KL10, KR1-KR10 are varied until the deviation of the directions of the forces F1-F6 from the direction of the gravitational force in the vehicle coordinate system X-Y-Z is minimal. The nodal points KL1-KL10, KR1-KR10 are located on lateral edges 11', 12' of the modeled seat belt 1'. It is, however, also conceivable that other points of the seat belt 1' are used as support points.

In the present case, the nodal points KL1-KL10, KR1-KR10 are positioned such that they have a distance from each other that corresponds to the width of the (real) seat belt 1, which must be taken into account as a boundary condition when minimizing the directional deviation. Furthermore, the nodal points KL1-KL10, KR1-KR10 are to be placed such that the sensors 21'-26' each are located on a connecting line V of two nodal points (of a pair of nodal points) respectively associated with one of the sensors 21'-26'. When carrying out the optimization algorithm, further boundary conditions can include a specified distance of the lowermost sensor or of the associated pair of nodal points from a lower belt deflector and/or a specified distance of the uppermost sensor of the associated pair of nodal points from an upper belt deflector, as already explained above. Boundary conditions can also be set to the effect that a course of the seat belt between the lowermost sensor and the lower belt deflector or between the uppermost sensor and the upper belt deflector is specified, as for example already explained above.

The optimization algorithm (minimization algorithm) can be based on further geometrical or other boundary conditions; for example with respect to the geometry of the seat belt, mechanical properties of the seat belt, the position of the belt deflection areas, the position of the vehicle seat and/or the orientation of the vehicle seat. It is also conceivable that the modeled course of the seat belt shall correspond to a curve of low curvature as far as possible.

Figure 4:
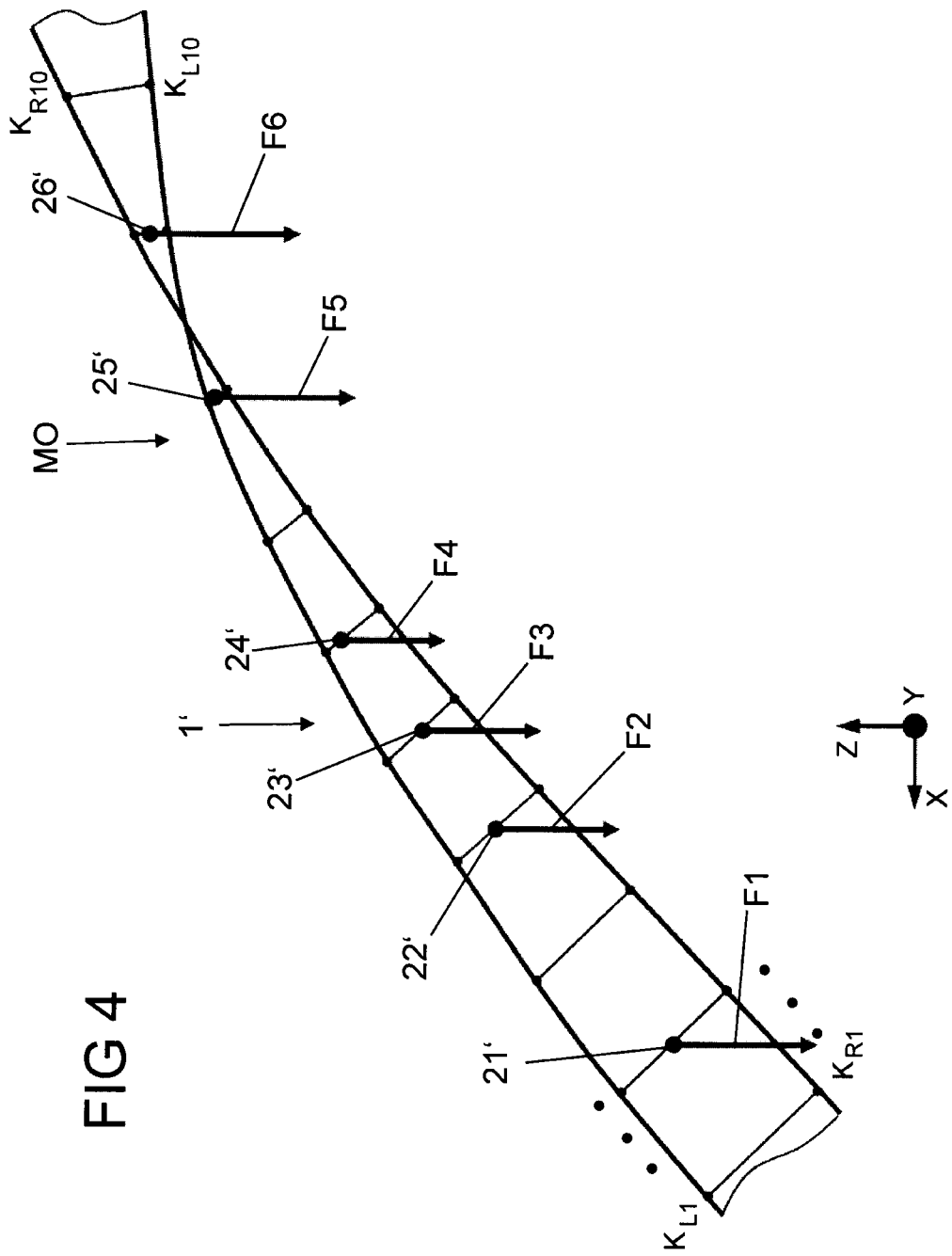
FIG. 4 shows a model of the seat belt of FIG. 3 in a final state of modeling.

A result of the application of the optimization algorithm is shown in FIG. 4, according to which portions of the seat belt 1' are oriented such that the forces F1-F6 determined by the sensors 21'-26' point down, and thus the modeled seat belt 1' has a course that simulates the actual course of the seat belt 1 as well as possible.

Depending on this calculated course of the seat belt—for example depending on a comparison of the course of the modeled seat belt 1' with a reference course—it is finally possible to determine information with respect to the vehicle occupant and/or the seat belt itself. For example, information with respect to the body height of the vehicle occupant, the body posture of the vehicle occupant, his/her seating position or a change of the seating position, his/her vital parameters and/or with respect to the fastening status is determined. In addition, as already explained above, it is possible to provide data for further processes and/or to trigger reactions of the vehicle. For example, the provided data can be used for controlling signaling devices, restraint systems and other safety devices.

Figure 5:
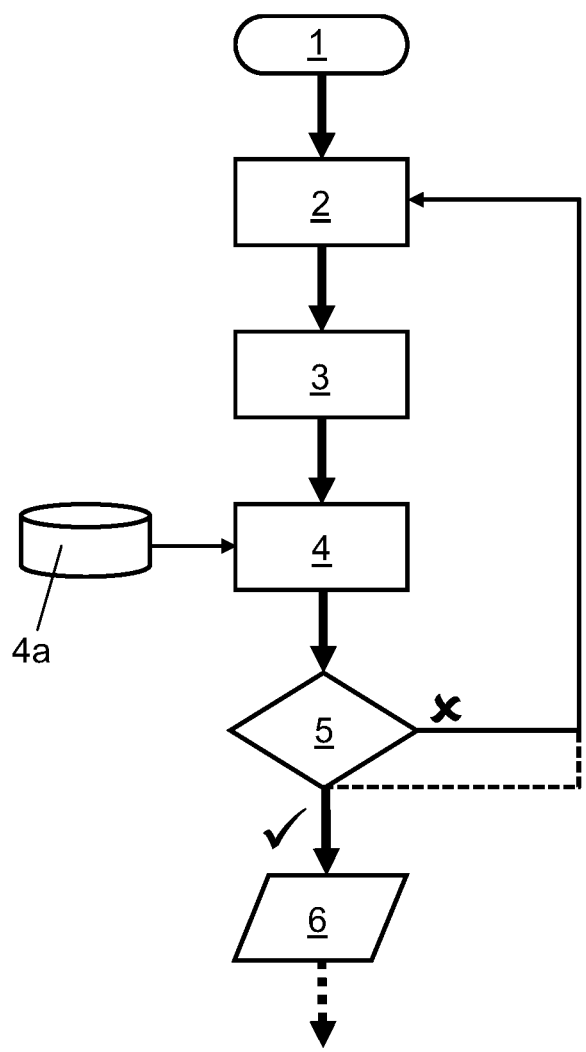
FIG. 5 shows a flow diagram of an exemplary embodiment of the method according to the proposed solution.

FIG. 5 shows a flow diagram of an exemplary embodiment of the method according to the solution. According to step 1, providing a seat belt equipped with sensors and fastening the seat belt is effected by a vehicle occupant to be protected with the belt.

Subsequently, a determination of the acceleration or force acting on a sensor is effected by each of the sensors (step 2). Finally, there is generated a numerical model of the seat belt in an initial state, which model contains the positions and orientations of the sensors as well as the directions of each of the forces determined by the sensors in the respective sensor coordinate system. For simulating the course of the real seat belt, selected nodal points (support places, in particular support points) of the model of the seat belt then are shifted by using a minimization algorithm, until in a coordinate system corresponding to a vehicle coordinate system the deviations of the directions of the forces determined by the sensors from the direction of the gravitational force are minimal (step 3).

In the following step 4, an interpretation and/or allocation of the course of the seat belt calculated according to step 3 is effected. This can be done by using external data (for example a reference course of the seat belt) from a database or another data source 4a. According to step 5, the results of step 4 are forwarded or processed depending on the interpretation and/or allocation of step 4. If no forwarding or processing is to be effected, the process starts again with step 2. Otherwise, an output of data for further processes, which have already been explained above, is effected according to step 6. Even if step 6 is carried out, the method can be carried out again starting with step 2 (in FIG. 5 indicated by the broken line below step 5).

The invention claimed is:

1. A method for determining information with respect to an occupant and/or a seat belt of a motor vehicle, wherein the seat belt includes a plurality of sensors, comprising the following steps:
    determining a force acting on each of the sensors in a sensor coordinate system associated with each of the sensors;
    generating a numerical model of the seat belt and of the sensors in an initial state, wherein in the numerical model the positions and orientations of the sensors and the directions of forces determined by each of the sensors are represented;
    generating a final state of the model by varying positions and/or orientations of portions of the modeled seat belt, which are in a fixed geometrical relationship with the represented positions and/or orientations of at least some of the sensors, proceeding from the initial state, until in a coordinate system corresponding to a vehicle coordinate system deviations of the directions of the forces determined by the sensors from a direction of gravitational force is minimal; and determining information with respect to the occupant and/or the seat belt based on a course of the modeled seat belt in the final state.

2. The method according to claim 1, wherein in numerical model at least two support places of the seat belt each are associated with the modeled sensors, wherein the positioning and/or orienting of the portions of the modeled seat belt is effected by positioning the support places.

3. The method according to claim 2, wherein of the two support places associated with a modeled sensor the one support place is associated with a point of a first edge of the modeled seat belt, and the second support place is associated with a point of a second, opposite edge of the modeled seat belt.

4. The method according to claim 3, wherein the two support places associated with a modeled sensor have a distance from each other that corresponds to the width of the seat belt.

5. The method according to claim 2, wherein the distance between adjacent support places associated with different modeled sensors along the longitudinal direction of the modeled seat belt is equal.

6. The method according to claim 2, wherein the two support places each are positioned such that one of the modeled sensors each is located on a connecting line between the two support places extending perpendicularly to a longitudinal direction of the modeled seat belt.

7. The method according to claim 6, wherein the model of the seat belt is created such that in the modeled seat belt a sum of the angles between adjacent connecting lines is minimal.

8. The method according to claim 2, wherein the model of the seat belt contains a position of a deflection device for deflecting the seat belt, wherein in the model a distance and/or a course of the seat belt between the position of the deflection device and at least one of the support places adjacent to the deflection device is specified.

9. The method according to claim 2, wherein the model of the seat belt contains a position of a lower deflection device in a vicinity of a belt buckle to which the seat belt is connected, wherein the model specifies a distance and/or a course of the seat belt between the position of the lower deflection device and at least one of the support places adjacent to the lower deflection device.

10. The method according to claim 1, wherein the model of the seat belt is created such that the course of the modeled seat belt has as little curvature as possible.

11. The method according to claim 1, wherein with reference to the course of the modeled seat belt an information with respect to a height, a seating position of the vehicle occupant, a seating posture of the vehicle occupant and/or a status of the seat belt is determined as information with respect to the vehicle occupant and/or the seat belt.

12. The method according to claim 11, wherein depending on the determined information a reaction of a system of the vehicle takes place.

13. A non-transitory computer program product comprising commands which on execution of the program by a computer cause the same to carry out the method according to claim 1.

14. A seat belt arrangement for a motor vehicle, comprising:
 a seat belt,
 a plurality of sensors arranged on the seat belt;
 an evaluation device for evaluating signals of the sensors, wherein the evaluation device is configured to carry out the following steps:
  determining a force acting on each of the sensors in a sensor coordinate system associated with each of the sensors;
  generating a numerical model of the seat belt and of the sensors in an initial state, wherein in the numerical model the positions and orientations of the sensors and the directions of the forces determined by each of the sensors are represented;
  generating a final state of the numerical model by varying positions and/or orientations of portions of the modeled seat belt, which are in a fixed geometrical relationship with the represented positions and/or orientations of at least some of the sensors, proceeding from the initial state, until in a coordinate system corresponding to a vehicle coordinate system deviations of the directions of the forces determined by the sensors from a direction of gravitational force is minimal; and
  determining information with respect to the occupant and/or the seat belt based on the course of the modeled seat belt in the final state.

15. The seat belt arrangement according to claim 14, wherein the sensors are at least partly arranged on the seat belt in a grid-like pattern.

* * * * *